United States Patent
Chacon et al.

(10) Patent No.: US 10,691,602 B2
(45) Date of Patent: Jun. 23, 2020

(54) ADAPTIVE GRANULARITY FOR REDUCING CACHE COHERENCE OVERHEAD

(71) Applicant: Intel Corporation, Santa Clara, CA (US)

(72) Inventors: Gino Chacon, Longview, TX (US); Alaa R. Alameldeen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 61 days.

(21) Appl. No.: 16/024,666

(22) Filed: Jun. 29, 2018

(65) Prior Publication Data

US 2019/0050333 A1 Feb. 14, 2019

(51) Int. Cl.
*G06F 12/08* (2016.01)
*G06F 12/084* (2016.01)
*G06F 12/0815* (2016.01)

(52) U.S. Cl.
CPC ........ *G06F 12/084* (2013.01); *G06F 12/0815* (2013.01); *G06F 2212/1016* (2013.01)

(58) Field of Classification Search
CPC .... G06F 12/08; G06F 12/0891; G06F 12/082; G06F 12/0817; G06F 12/0804; G06F 12/084; G06F 12/0815; G06F 12/0822; G06F 12/0895; G06F 12/0897; G06F 12/0831; G06F 12/0826; G06F 12/0842; G06F 12/126; G06F 12/128; G06F 2212/62; G06F 2212/1048
USPC ........................................................ 711/130
See application file for complete search history.

(56) References Cited

U.S. PATENT DOCUMENTS

| | | | | |
|---|---|---|---|---|
| 5,603,005 A | * | 2/1997 | Bauman | G06F 12/0808 710/317 |
| 5,860,108 A | * | 1/1999 | Horikawa | G06F 12/0817 709/213 |
| 6,347,360 B1 | * | 2/2002 | Moudgal | G06F 12/0831 711/133 |

(Continued)

OTHER PUBLICATIONS

Huang, et al, "C3D:Mitigating the NUMA Bottleneck via Coherence DRAM Caches" Institute of Computing Systems Architecture, University of Edinburgh, MICRO, Taipei, Taiwan, Oct. 2016.

(Continued)

*Primary Examiner* — Mano Padmanabhan
*Assistant Examiner* — Jean C Edouard
(74) *Attorney, Agent, or Firm* — Compass IP Law PC

(57) ABSTRACT

To reduce overhead for cache coherence for shared cache in multi-processor systems, adaptive granularity allows tracking shared data at a coarse granularity and unshared data at fine granularity. Processes for adaptive granularity select how large of an entry is required to track the coherence of a block based on its state. Shared blocks are tracked in coarse-grained region entries that include a sharer tracking bit vector and a bit vector that indicates which blocks are likely to be present in the system, but do not identify the owner of the block. Modified/unshared data is tracked in fine-grained entries that permit ownership tracking and exact location and invalidation of cache. Large caches where the majority of blocks are shared and not modified create less overhead by being tracked in the less costly coarse-grained region entries.

20 Claims, 7 Drawing Sheets

(56) References Cited

U.S. PATENT DOCUMENTS

| | | | |
|---|---|---|---|
| 2002/0133674 A1* | 9/2002 | Martin | G06F 12/0817 711/141 |
| 2006/0236039 A1* | 10/2006 | Golander | G06F 13/28 711/147 |
| 2007/0079075 A1* | 4/2007 | Collier | G06F 12/082 711/141 |
| 2008/0195820 A1* | 8/2008 | Lais | G06F 12/082 711/146 |
| 2009/0006777 A1* | 1/2009 | Donley | G06F 12/0895 711/154 |
| 2014/0351524 A1* | 11/2014 | Natarajan | G06F 12/0891 711/130 |
| 2016/0378655 A1* | 12/2016 | Blagodurov | G06F 12/0811 711/122 |

OTHER PUBLICATIONS

Zebchuk, et al:, "Multi-Grain Coherence Directories", Micro'46, Dec. 7-11, 2013, Davis, CA, USA, 12 pages.

* cited by examiner

202 Owner Entry Format

| TAG | STATE | OWNER ID | SHARING VECTOR |
|---|---|---|---|
| 36 | 2 | 2 | 2 |

= 6 BYTES PER ENTRY = 768 MB

204 Region Entry/Private Entry Formats for tracking modified data to reduce overhead 206 – Region Entry

| ENTRY TAG | STATE | SHARE VECTOR | BLOCKS PRESENT VECTOR |
|---|---|---|---|
| 36 | 1 | 2 | 2 | e.g., (S)ocket1, S2, S3, S4

208 – Private Entry

| ENTRY TAG | STATE | OWNER ID | BLOCKS PRESENT VECTOR |
|---|---|---|---|
| 36 | 1 | 2 | 2 | e.g., Core x, x= 1,....32

210 – Example entry type percentages for global directory (90 region and 10 private) and resulting global directory overhead savings

{ 90 % = 172 MB ; 10 % = 77 MB } = 6 BYTES PER ENTRY = 249 MB

768 − 249 = 519 MB saved, a 67 % reduction in overhead

Fig. 2

ADAPTIVE GRANULARITY FOR REDUCING CACHE COHERENCE OVERHEAD

TECHNICAL FIELD

The technical field relates generally to computer system memory, and in particular to controlling memory in high-performance computing systems.

BACKGROUND

High-performance computer (HPC) systems typically use multi-processors, including processors with multiple cores and multiple physical processors, also referred to as multiple sockets, all of which interoperate to increase computing power. HPC systems often use dynamic random access memory (DRAM) data caches to reduce the number of off-socket requests for data by keeping data local. Because the multi-processors typically share memory as well as maintain the caches for faster memory access, global cache directories are maintained to insure cache coherence. Cache coherence refers to the uniformity of shared data that is stored in multiple local caches.

Maintaining global cache directories is often accomplished by tracking the data in the DRAM caches and replacing or removing outdated cache entries from the global cache directory as needed using a process referred to as "invalidation." However, tracking data to maintain coherence incurs a large amount of overhead in the global directory. As the number of processors grows the size of the global cache directory grows, thereby increasing overhead and impacting performance.

BRIEF DESCRIPTION OF THE DRAWINGS

The described embodiments are illustrated by way of example and not limitation in the figures of the accompanying drawings, in which like references indicate similar elements and in which:

FIG. 2 is a schematic block diagram illustration comparing formats of global directory entries, including entries for adaptive granularity for reducing cache coherence overhead in accordance with various examples described herein;

Figure 1:
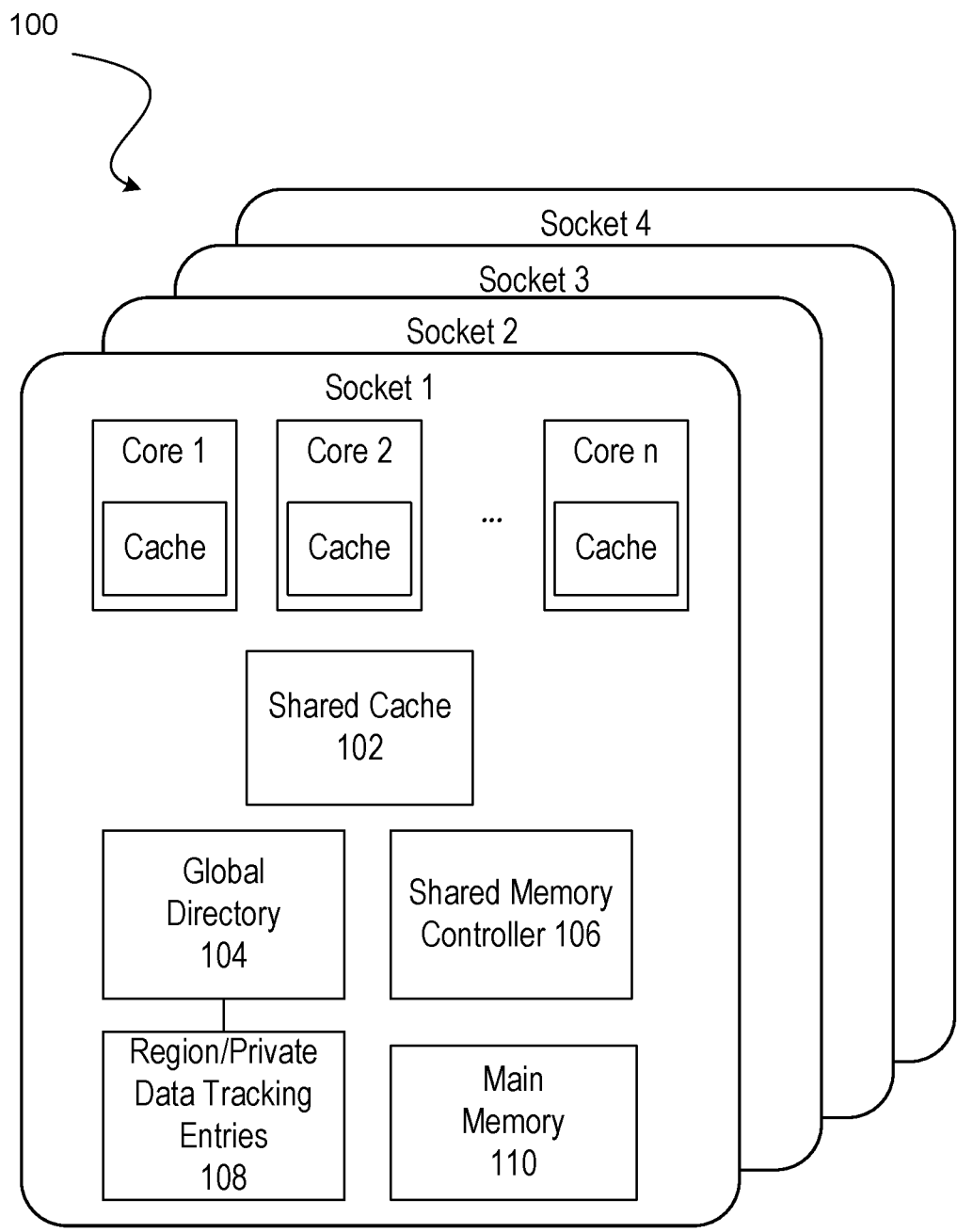
FIG. 1 is a simplified block diagram of an example multi-processor computer architecture in which adaptive granularity for reducing cache coherence overhead can be implemented in accordance with various examples described herein.

Other features of the described embodiments will be apparent from the accompanying drawings and from the detailed description that follows.

DESCRIPTION OF THE EMBODIMENTS

The overhead in global directories for cache coherence in multi-processor systems is due in large part to tracking data that is written to cache and insuring that the cache is prevented from containing "dirty" data, i.e. does not contain data that has been modified in cache but not in main memory. Preventing the cache from containing "dirty" data means that when an invalidation of "dirty" data is needed in a socket, a request must be sent to every socket since it's not explicitly known if the data is present in a socket.

Proposals to reduce the overhead in global directories for cache coherence include a multi-grain coherence directory that targets reducing overhead in large memory caches by allowing two levels of granularity. Data that is private is tracked in an entry that indicates an entire region that is privately owned by a specific socket. If data is requested and made shared between two sockets, the entry is changed to remove the new shared data from the region and a new entry is made to represent the shared data as a single tracked block. Data is more likely to be private than shared when using an MESI coherence protocol that uses four exclusive states for representing cache, modified, exclusive, shared and invalid).

However, to reduce metadata overhead, a different coherence protocol is used in systems with DRAM caches—the MSI coherence protocol, which uses only three exclusive states for representing cache, modified, shared and invalid. MSI limits the number of blocks considered private to only data written to cache (as opposed to data read from cache). Because the majority of requests for data are read requests, blocks considered private are less likely to occur. For this reason, the multi-grain coherence directory targeting the tracking of private data is not as useful for systems with DRAM caches that use the MSI coherence protocol.

To address the challenge of reducing overhead for cache coherence in the context of DRAM memory, embodiments of an adaptive granularity for reducing cache coherence overhead as herein described allows tracking the state of shared data at a coarse granularity and modifications to unshared data at fine granularity.

In one embodiment, an adaptive granularity for reducing cache coherence overhead selects how large of an entry is required to track the coherence of a block based on its state. Shared blocks are tracked in coarse-grained region entries that include a sharer tracking bit vector, also referred to herein as a share vector, and a bit vector that indicates which blocks are guaranteed to be present in the system, also referred to herein as a blocks present vector. An owner socket entry, such as the entry typically used in conventional global cache directories, is not required for shared blocks since once the share vector and blocks present vector begin to be populated, the owner might not own all tracked blocks in the region entry. Modifications to unshared blocks is tracked in fine-grained entries that specifies where the unshared block is present as well as the current owner of the unshared block.

In one embodiment the tracking the state of shared blocks at the coarse granularity includes region directory entries that identify possible sharers of the data and which blocks are likely to be present in the shared region, where the shared region encompasses sockets identified as possible sharers in a plurality of sockets in a multi-processor system for which cache coherence is maintained. In contrast, tracking modifications to unshared data at the fine granularity includes private directory entries that identify the current owner of the block and the blocks location, and permit exact invalidation and ownership tracking.

In one embodiment, the region directory entries identify possible sharers of shared data in a share vector, where possible sharers are represented in a bit in the share vector that corresponds to a socket with which the data has been shared. In one embodiment, the region directory entries include a blocks present vector that describes which blocks might be present in the sockets identified as possible sharers.

In one embodiment, the private directory entries identify an owner of the data in an owner id, where the owner id is associated with a processing core of one of the plurality of sockets for which cache coherence is maintained. In one embodiment the private directory entries include a block present vector that describe an unshared block of data that is guaranteed to be present at a particular location in the socket with which the owner id is associated, i.e. the processing core.

In one embodiment, for the coarse-grained entries, the data described in the blocks present vector is guaranteed to be present in any one or more of the sockets corresponding to the possible sharers identified in the shared vector if the shared vector only contains a single entry. Similarly, in one embodiment, the data described in the blocks present vector is guaranteed to be present in any one or more of the sockets corresponding to the possible sharers identified in the shared vector if the blocks present vector only contains a single entry.

In one embodiment, in all other cases for the coarse-grained entries, i.e. the shared vector contains two or more entries for possible sharers or the blocks present vector contains two or more entries describing blocks present, the data described in the blocks present vector may or may not be present in the sockets corresponding to the possible sharers identified in the shared vector. For this reason, tracking the data in the coarse-grained entries reduces the overhead of the directory at the cost of containing false-positives on the presence of the blocks in the sockets corresponding to the possible sharers identified in the shared vector.

In one embodiment, the majority of the directory entries in a global cache directory can be maintained in coarse directory entries depending on the prevalence of the different types of data access, such as read access or write access. For example, data that is not modified but simply read, which typically represents the majority of data in a high performance computing system, can be maintained in the coarse-grained directory entries at lower cost with little performance impact due to the low risk of false positives, while data that is modified, which typically represents a smaller volume of data in a high performance computing system, can be maintained in a lesser number of fine-grained directory entries without risk of false positives. Taken together, adaptive granularity of the directory entries can yield significant savings in overhead as will be described in further detail.

In the description that follows, examples may include subject matter such as a method, a process, a means for performing acts of the method or process, an apparatus, a memory device, and a system for adaptive granularity for reducing cache coherence overhead, and at least one machine-readable tangible storage medium including instructions that, when performed by a machine or processor, cause the machine or processor to performs acts of the method or process according to embodiments and examples described herein Numerous specific details are set forth to provide a thorough explanation of embodiments of the methods, media and systems for providing adaptive granularity for reducing cache coherence overhead. It will be apparent, however, to one skilled in the art, that an embodiment can be practiced without one or more of these specific details. In other instances, well-known components, structures, and techniques have not been shown in detail so as to not obscure the understanding of this description.

Reference in the specification to "one embodiment" or "an embodiment" means that a particular feature, structure, or characteristic described in connection with the embodiment can be included in at least one embodiment. The appearances of the phrase "in one embodiment" in various places in the specification do not necessarily all refer to the same embodiment.

The methods, processes and logic depicted in the figures that follow can comprise hardware (e.g. circuitry, dedicated logic, controllers, etc.), software (such as is run on a general-purpose computer system or a dedicated machine, e.g. a software module or logic), and interfaces (such as a memory interface) between hardware and software, or a combination of both. Although the processes and logic are described below in terms of some sequential operations, it should be appreciated that some of the operations described can be performed in a different order. Moreover, some operations can be performed in parallel rather than sequentially.

In any one or more of the embodiments of the systems, apparatuses and methods for adaptive granularity for reducing cache coherence overhead herein described, means for performing any one or more of the systems, apparatuses and methods is herein described.

In any one or more of the embodiments of the systems, apparatuses and methods for adaptive granularity for reducing cache coherence overhead herein described, at least one computer-readable storage medium includes instructions that, when executed on one or more processors of a computer system cause the processor(s) to perform any one or more of the embodiments of the systems, apparatuses and methods herein described.

FIG. 1 is a simplified block diagram of an example multi-processor computer architecture in which adaptive granularity for reducing cache coherence overhead can be implemented in accordance with various examples described herein. Referring to FIG. 1, by way of example only and not limitation, in some embodiments a multi-processor system 100 includes one or more sockets, such as the illustrated Socket 1, Socket 2, Socket 3 and Socket 4, each coupled to one another and each containing a multi-core processor, Core 1, Core 2, . . . . Core n. In one embodiment each core is coupled to a local cache and each socket is coupled to a shared cache 102. A global cache directory 104 contains a plurality of region entries and a plurality of private entries 108 in which to track data modified in random access memory comprising the multiple local caches of Core 1, Core 2, . . . Core n, as well as the shared cache 102.

In one embodiment, system 100 employs a shared memory architecture that allows memory to be shared between independent nodes for exclusive or shared access using load/store or read/write memory semantics, where an independent node includes a core of a multi-core processor, such as Core 1, Core 2, . . . Core n. For example, in the illustrated multi-processor system 100, each socket is coupled to a shared memory controller 106 and a main memory 110, where the memory controller 106 controls the operations performed on main memory 110, shared cache 102 and local caches of Core 1, Core 2, . . . Core n in accordance with embodiments of adaptive granularity for reducing cache coherence as described herein.

For instance, a shared memory controller 106 can be provided that accepts load/store or read/write access requests of the various nodes/cores on the system, including cache requests. Shared cache 102 can be implemented utilizing synchronous dynamic random access memory (SDRAM), dual in-line memory modules (DIMM), and other non-volatile memory (or volatile memory). Each node may itself have one or multiple CPU sockets and may also include local memory/cache that remains insulated from access by other nodes in the system. The node can communicate with other devices on the system (e.g., shared memory controller 106 and other nodes/cores, etc.) using one or more protocols, including PCIe, QPI, Ethernet, among other examples. In some implementations, a shared memory link (SML) protocol can be provided through which low latency memory semantics can be supported. SML can be used, for instance, in communicating reads and writes of shared cache 102 (through shared memory controller 106) by the various nodes/cores of a multi-processor system 100.

In one example, SML can be based on a memory access protocol, such as Scalable Memory Interconnect (SMI) 3rd generation (SMI3). Other memory access protocols can be alternatively used, such as transactional memory access protocols such as fully buffered DIMM (FB-DIMM), DDR Transactional (DDR-T), among other examples. In other instances, SML can be based on native PCIe memory read/write semantics with additional directory extensions. A memory-protocol-based implementation of SML can offer bandwidth efficiency advantages due to being tailored to cache line memory accesses. While high performance inter-device communication protocols exist, such as PCIe, upper layers (e.g., transaction and link layers) of such protocols can introduce latency that degrades application of the full protocol for use in LD/ST memory transactions, including transactions involving a shared cache 102. A memory protocol, such as SMI3, can allow a potential additional advantage of offering lower latency accesses since it can bypass most of another protocol stack, such as PCIe. Accordingly, implementations of SML can utilize SMI3 or another memory protocol running on a logical and physical PHY of another protocol, such as SMI3 on PCIe.

As noted, in some implementation, a shared memory controller 106 can be provided that includes logic for handling load/store requests of nodes Core 1, Core 2, . . . Core n in a multi-processor system 100. Load/store requests can be received by the share memory controller 106 over links utilizing a shared memory link and connecting the nodes Core 1, Core 2 . . . Core n to the shared memory controller 106. In some implementations the shared memory controller 106 can be implemented as a device, such as an application-specific integrated circuit (ASIC), including logic for servicing the access requests of the nodes Core 1, Core 2, . . . Core n for shared memory resources. In other instances, the shared memory controller 106 as well as shared cache 102 can reside on a device, chip, or board separate from one or more (or even all) of the nodes Core 1, Core 2, . . . Core n. The shared memory controller 106 can further include logic to coordinate various nodes' transactions that involve shared cache 102. Additionally, the shared memory controller 106 can maintain a global cache directory 104 tracking access to various data resources, such as each cache line, included in shared cache 102. For instance, a data resource can be in a shared access state (e.g., capable of being accessed (e.g., loaded or read) by multiple processing and/or I/O devices within a node, simultaneously, an exclusive access state (e.g., reserved exclusively, if not temporarily, by a single processing and/or I/O device within a node (e.g., for a store or write operation), an uncached state, among other potential examples. Further, while each node may have direct access to one or more portions of shared cache 102, different addressing schemes and values may be employed by the various nodes Core 1, Core 2, . . . . Core n resulting in the same shared memory data being referred to (e.g., in an instruction) by a first node according to a first address value and a second node being referring to the same data by a second address value. The shared memory controller 106 can include logic, including data structures mapping nodes' addresses to shared memory resources, to allow the shared memory controller 106 to interpret the various access requests of the various nodes Core 1, Core 2, Core n.

Additionally, in some cases, some portion of shared memory (e.g., certain partitions, memory blocks, records, files, etc.) may be subject to certain permissions, rules, and assignments such that only a portion of the nodes Core 1, Core 2, . . . Core n are allowed (e.g., by the shared memory controller 106) to access the corresponding data. Indeed, each shared memory resource may be assigned to a respective (and in some cases different) subset of the nodes Core 1, Core 2, . . . Core n of the system. These assignments can be dynamic and shared memory controller 106 can modify such rules and permissions (e.g., on-demand, dynamically, etc.) to accommodate new or changed rules, permissions, node assignments and ownership applicable to a given portion of the shared cache 102.

An example shared memory controller 106 can further track various transactions involving nodes (e.g., Core 1, Core 2, . . . Core n) in the system accessing one or more shared memory resources. For instance, shared memory controller 106 can track information for each shared memory 102 transaction, such as the cache requests described herein, shared cache requests and modified cache requests, including identification of the node(s) involved in the transaction, progress of the transaction (e.g., whether it has been completed), among other transaction information. This can permit some of the transaction-oriented aspects of traditional distributed memory architectures to be applied to the improved multi-node shared memory architecture described herein. Additionally, transaction tracking (e.g., by the shared memory controller) can be used to assist in maintaining or enforcing the distinct and independent fault domains of each respective node. For instance, the shared memory controller can maintain the corresponding Node ID (e.g., Core 1, Core 2, . . . Core n) for each transaction-in-progress in its internal data structures, including in memory, and use that information to enforce access rights and maintain individual fault-domains for each node. Accordingly, when one of the nodes goes down (e.g., due to a critical error, triggered recovery sequence, or other fault or event), only that node and its transactions involving the shared memory 102 are interrupted (e.g., dumped by the shared memory controller 106)—transactions of the remaining nodes that involve the shared cache 102 continue on independent of the fault in the other node.

A multi-processor system 100 can include multiple nodes. Additionally, some example systems can include multiple shared memory controllers 106. In some cases, a node may be able to access shared memory off a remote shared memory controller to which it is not directly attached to (i.e., the node's local shared memory controller connects to the remote shared memory controller through one or multiple shared memory links). The remote shared memory controller may be in the same board or could be in a different board. In some cases, some of the nodes may be off-system (e.g., off board or off chip) but nonetheless access shared cache 102. For instance, one or more off-system nodes can connect directly to the shared memory controller 106 using a link that is compliant with a shared memory link, among other examples. Additionally, other systems that include their own shared memory controller and shared memory can also connect with the shared memory controller 106 to extend sharing of cache 102 to nodes included, for instance, on another board that interface with the other shared memory controller connected to the shared memory controller 106 over a shared memory link. Still further, network connections can be tunneled through to further extend access to other off-board or off-chip nodes. For instance, a shared memory link can tunnel over an Ethernet connection (e.g., provided through a network controller, not shown) communicatively coupling the example system 100 of FIG. 1 with another system that can also include one or more other nodes, Core 1, Core 2 . . . Core n and allow these nodes to also gain access to shared memory controller 106 and thereby shared cache 102, among other examples.

In various embodiments, at least some of the local cache and shared cache 102 as well as main memory 110 may be implemented using volatile memory, e.g., static random access memory (SRAM), a dynamic random access memory (DRAM). In one embodiment, the memory devices used for main memory 110 and/or caches 102 is a block addressable memory device, such as those based on NAND or NOR technologies. In one embodiment, the memory device may be implemented using non-volatile memory. In one embodiment, the nonvolatile memory may be byte or block addressable.

A memory device may also include future generation nonvolatile devices, such as a three dimensional (3D) crosspoint memory device, or other byte addressable write-in-place nonvolatile memory devices. In some embodiments, 3D crosspoint memory may comprise a transistor-less stackable cross point architecture in which memory cells sit at the intersection of word lines and bit lines and are individually addressable, and in which bit storage is based on a change in bulk resistance.

In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric random-access memory (FeRAM), ferroelectric transistor random access memory (FeTRAM), anti-ferroelectric memory, nanowire-based non-volatile memory, memory that incorporates memristor technology, magnetoresistive random access memory (MRAM) memory that incorporates memristor technology, resistive memory including the metal oxide base, the oxygen vacancy base and the conductive bridge Random Access Memory (CB-RAM), spin-transfer torque memory (STT-RAM) or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

FIG. 2 is a schematic block diagram illustration comparing formats of global directory entries, including entries for adaptive granularity for reducing cache coherence overhead in accordance with various examples described herein. As shown, an owner entry format 202 such as might typically be employed in a conventional global cache directory is contrasted with the region entry and private entry formats 204 for tracking modified data to reduce overhead in accordance with the embodiments described herein. The size of both region entry 206 and private entry 208 formats is the same and is processed during tracking modified data based on the entry's state. Rather than including both the owner id and a sharing vector in a same entry as in owner entry format 202, embodiments of the region entry 206 and private entry 208 instead include either a share vector (in the region entry 206) or an owner id (in the private entry 208), and each type of entry includes a blocks present vector, where the blocks present vector for the private entry is a single block present vector that specifies the location of the block. This allows the global directory to adapt the granularity of the entries to suit the type of data access encountered during operation of system 100. Thus, large volumes of data that are primarily accessed and shared but not modified can advantageously be maintained in region entries 206 at a coarse grained level that identifies possible sharers and presence of blocks rather than exact ownership and location.

In one embodiment, the tag of each entry (region or private) is dependent on the size of the cache and number of sets in the directory. In one embodiment the state of the entry changes how the entry's fields are treated. For example, if the state is not set, the entry is considered to contain a region entry 206 containing a share vector, which has a size equal to the number of sockets, e.g., S1, S2, S3, S4. If the state of the entry is set, then, using the private entry format 208, the portion of the entry used to contain the share vector is instead used to indicate the owner of the block, e.g. owner id.

In one embodiment, for either entry state, whether set or not set, the last field in the region entry 206 and private entry 208 is a blocks present vector representing which blocks for the region entry/modified entry are present. For a private entry 208 however, there is only one block indicated and the block present vector will contain a location of the block. In one embodiment, the size of the blocks present vector is dependent on how many blocks are tracked per entry.

The following example demonstrates how embodiments of adaptive granularity for reducing cache overhead reduces the amount of storage in a global directory for a 4 GB DRAM cache in a 4-socket system. For a basic directory scheme, the number of entries required in the directory to track a 4 GB DRAM cache in a 2× provisioned global directory is 227. For a 32-way directory, such as for 4-socket system that is 2× provisioned, global directory entries using a conventional owner entry format 202 require 36 bits for the tag, 2-bits for state, 2-bits for owner id, and 4 bits for the sharing vector, resulting in 6 bytes per entry and a total of 768 MB of storage overhead. In a 4 GB DRAM cache with a 2× provisioned global directory, each region entry 206 and private entry 208 requires 36 bits for the tag, 1 bit to represent the state as shared or modified, 4 bits for the share vector (for the region entry) or owner id (for the private entry), and 4 bits to represent the blocks present vector (for the region entry) or block present/location (private entry), also resulting in 6 bytes required per entry.

However, if as shown in example 210, 10% of the blocks in the DRAM cache are modified, the amount of state required to track these blocks is only 77 MB. The other 90% of the cache is divided into regions tracking 4 blocks each, which requires another 172 MB of storage resulting in a total of 249 MB required for tracking modified data. This reduces the overhead of tracking the large cache by 519 MB, or 67.5%, a significant savings.

Figure 3:
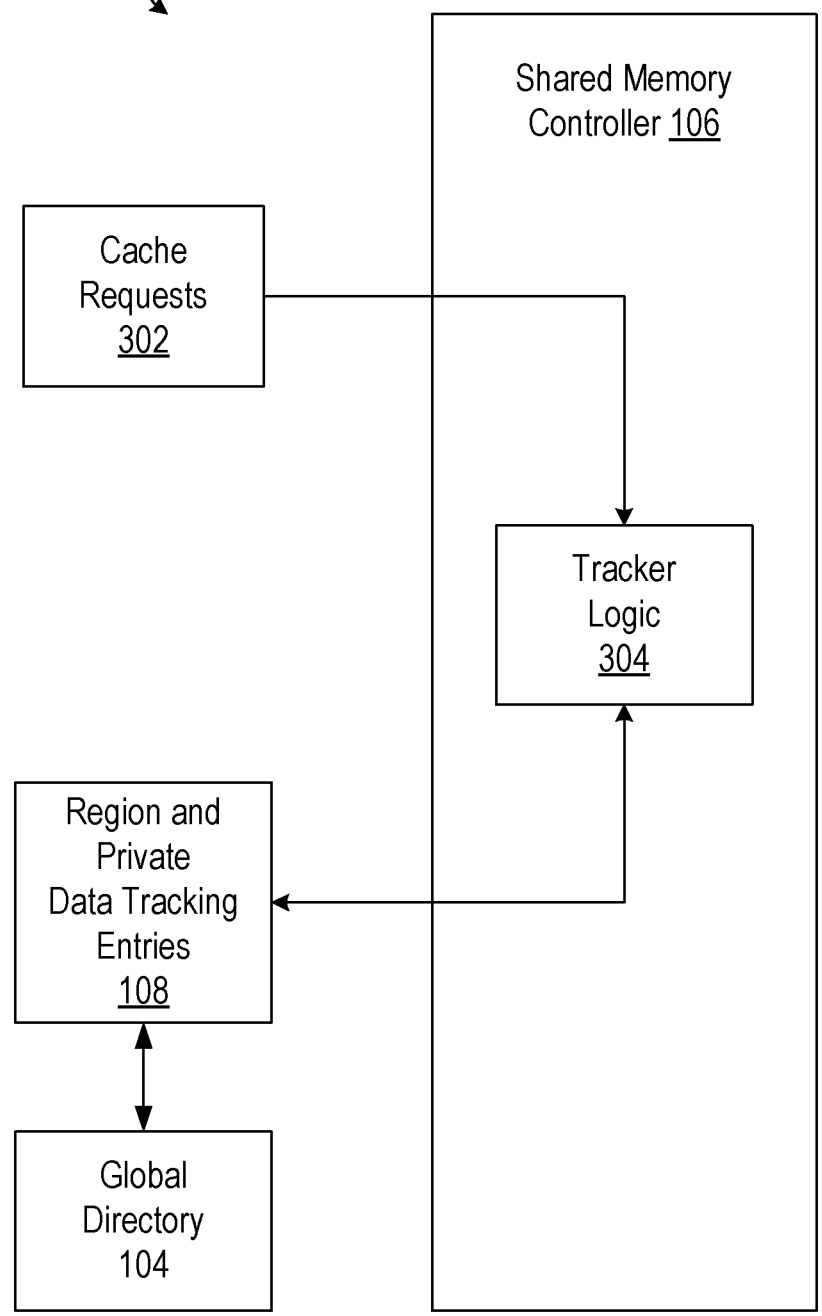
FIG. 3 is a block diagram illustrating an overview of one embodiment of an apparatus for adaptive granularity for reducing cache coherence overhead in accordance with various examples described herein.

FIG. 3 is a block diagram illustrating an overview of one embodiment of an apparatus for adaptive granularity for reducing cache coherence overhead in accordance with various examples described herein. The shared memory controller 106 includes a tracker logic 304 for receiving cache requests 302 from the various nodes, e.g. Core 1, Core 2, . . . Core n in sockets S1, S2, S3, S4. The tracker logic 304 generates and updates the region entries 206 for shared blocks of data, and private entries 208 for unshared blocks of data, where both region and private entries are included in the global cache directory 104.

Figure 4A:
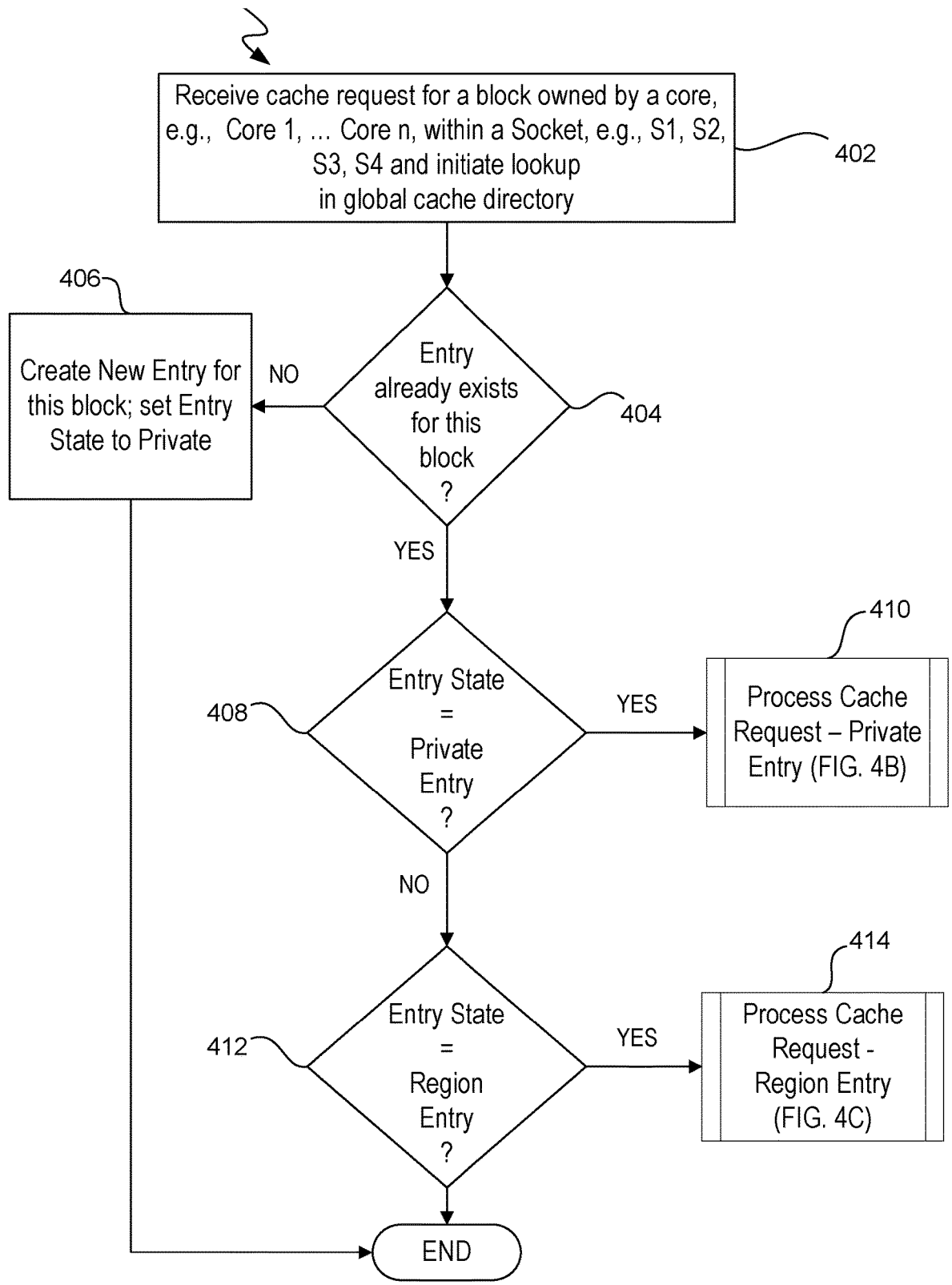
FIGS. 4A-4C are block diagrams illustrating embodiments of processes performed for adaptive granularity for reducing cache coherence overhead in accordance with various examples described herein.
Figure 4B:
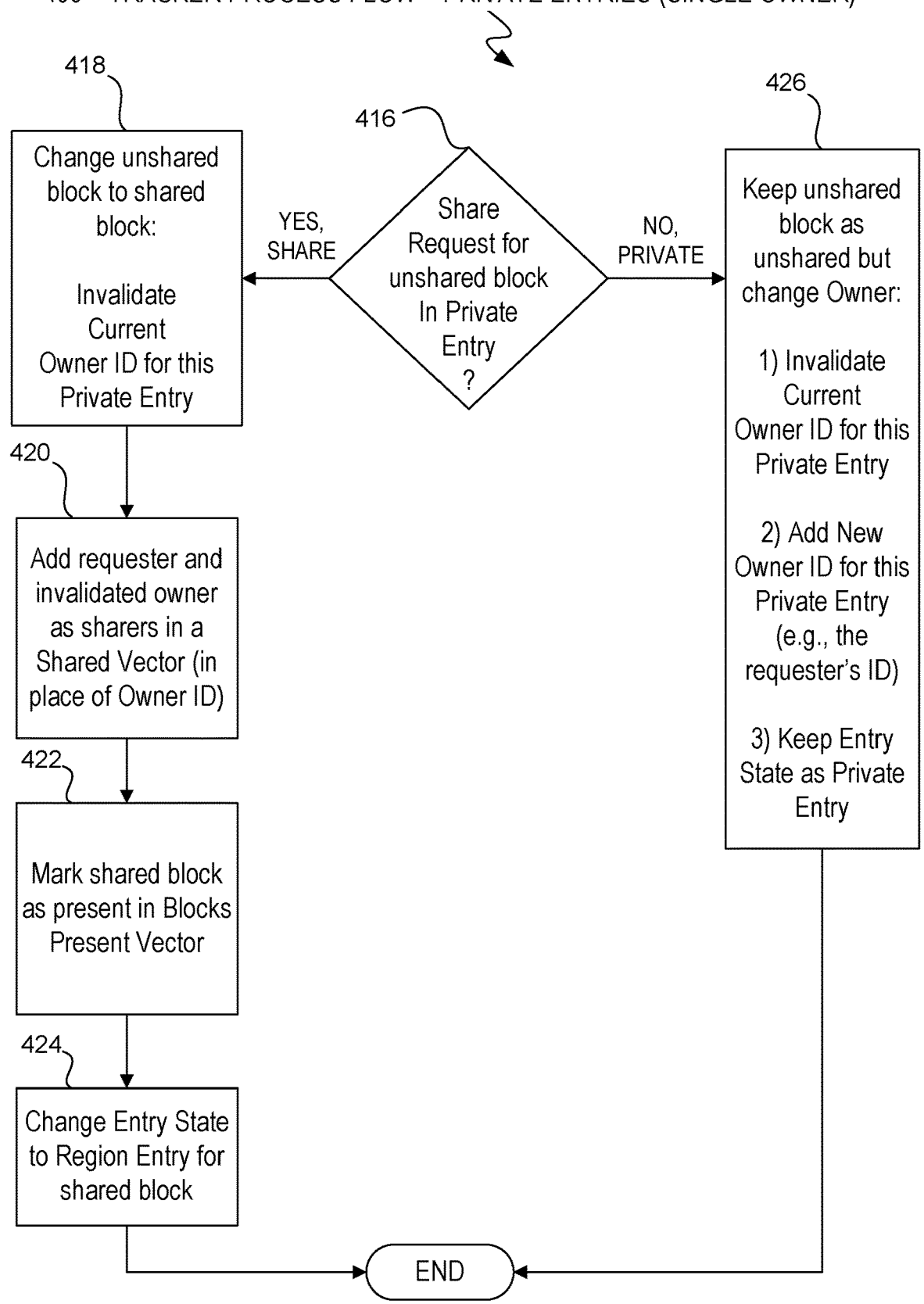
Figure 4C:
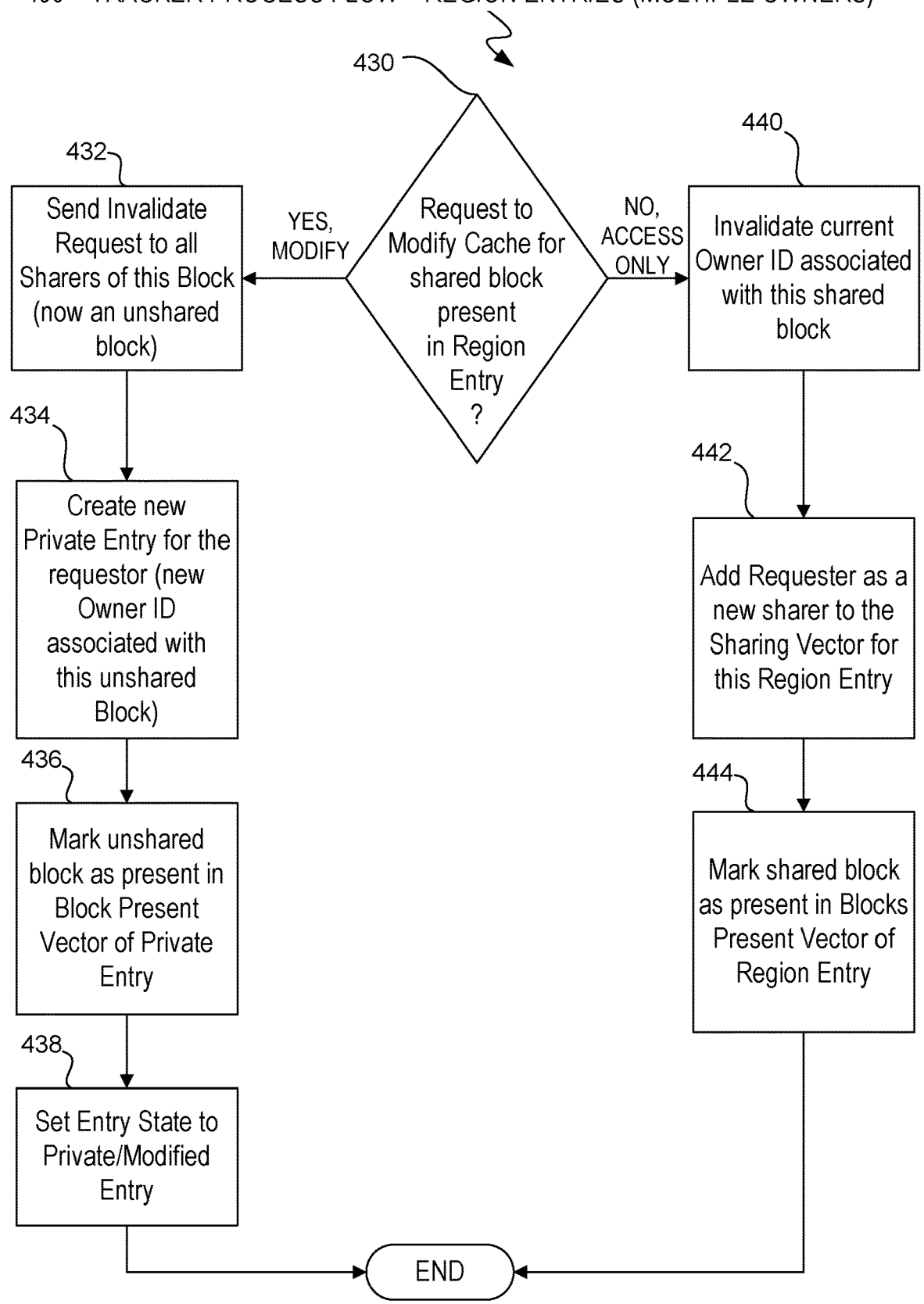

FIGS. 4A-4C are block diagrams illustrating embodiments of processes 400 performed for adaptive granularity for reducing cache coherence overhead in accordance with various examples described herein. In one embodiment, a tracker process 400 receives a cache request for a block owned by a node, Core 1, . . . Core n, within a socket, e.g. S1, S2, S3, S4, and initiates a lookup in the global cache directory to see if the block is already in a cache as indicated by its presence in an entry in the global cache directory. At 404 if an entry already exists for this block then at 408, the process 400 determines whether the entry state of the found entry is set as a private entry for an unshared block. If so, then process 400 branches control to process 410 to process the cache request against the private entry (FIG. 4B). If not, then process 400 determines whether the entry state of the found entry has not been set, thereby defaulting to a region entry state 412 for a shared block. If so, then process 400 branches control to process 414 to process the cache request against the region entry (FIG. 4C).

With reference to FIG. 4B, the process 400 continues at 416 to determine whether the cache request for the block found in a private entry is a share request. Recall that a private entry is one that refers only to one unshared block and one owner. A request to share the block necessarily means that the one owner is no longer the sole owner of the block. Therefore, at both processes 418 and 426, the process 400 initiates an invalidation of the current owner id for the unshared block in this private entry. When the cache request is for a private request, then the state of the entry remains the same, but a new owner id is associated with the private entry, thereby changing the owner of the still unshared block. However, when the cache request is to share the unshared block, then, after invalidating the current owner id, the process 400 adds 420 the requester and the invalidated owner as sharers in a share vector in the found entry, and the unshared block is now a shared block. At process 422, the process 400 marks the now shared block as present in the blocks present vector, and at 424 changes the entry state to a region entry to reflect the fact that access to the block is now shared by both the new and previous owners, i.e., that the block is now shared.

With reference to FIG. 4C, the process 400 continues at 430 to determine whether the cache request for the shared block found in a region entry is a request to modify the cache, as opposed to simply a request to access the cache. When the data/cache is being modified, process 400 initiates 432 an invalidation request to all sharers of the current shared block, where all sharers of the current block are indicated in the share vector contained in the region entry, e.g. the sockets, S1, S2, S3, S4. The completion of process 432 changes the block into an unshared block. At 434, the process 400 creates a new private entry for the request, and associates a new owner id with the private entry, where the new owner id is the node associated with the request, e.g., one of the nodes, Core 1, . . . Core x. At 436, the now unshared block is marked as present in the block present vector updated to include the location of the block. At 438, the process 400 concludes by setting the entry state of the entry record to a private entry.

In one embodiment, when the request is for access only and not to modify the cache, then process 400, after invalidating the current owner id associated with the block, adds 442 the requester as a new sharer to the sharing vector for this region entry, and marks 444 the block as present in the blocks present vector for this region entry. Because the shared block remains shared, there is no need to change the entry status, i.e. the region entry remains a region entry, and only the sharers and ownership change.

Figure 5:
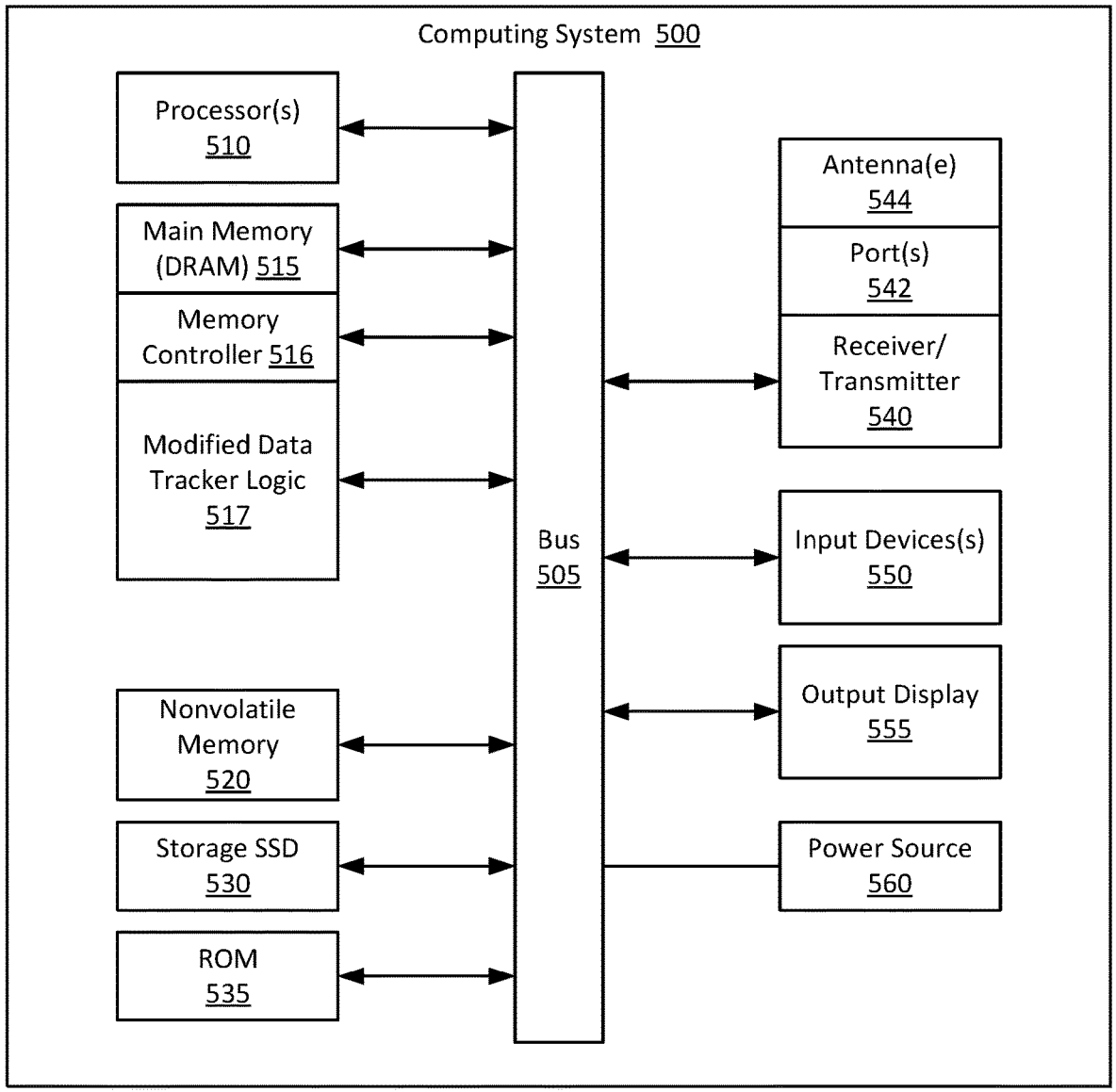
FIG. 5 illustrates an example of a typical computer system in which embodiments of processes for adaptive granularity for reducing cache coherence overhead can be implemented, either in whole or in part, in accordance with various examples described herein.

FIG. 5 is an illustration of a system for adaptive granularity for reducing cache coherence overhead, including, for example, a tracking logic to generate and maintain region entries for coarse-grained tracking of modified data and private entries for fine-grained tracking of modified data, in accordance with an embodiment. In this illustration, certain standard and well-known components that are not germane to the present description are not shown. Elements shown as separate elements may be combined, including, for example, a SoC (System on Chip) combining multiple elements on a single chip.

In some embodiments, a computing system 500 may include a processing means such as one or more processors 510 coupled to one or more buses or interconnects, shown in general as bus 505. The processors 510 may comprise one or more physical processors and one or more logical processors. In some embodiments, the processors may include one or more general-purpose processors or special-purpose processors.

The bus 505 is a communication means for transmission of data. The bus 505 is illustrated as a single bus for simplicity but may represent multiple different interconnects or buses and the component connections to such interconnects or buses may vary. The bus 505 shown in FIG. 5 is an abstraction that represents any one or more separate physical buses, point-to-point connections, or both connected by appropriate bridges, adapters, or controllers.

In some embodiments, the computing system 500 further comprises a random access memory (RAM) or other dynamic storage device or element as a main memory 515 and memory controller 516 for storing information and instructions to be executed by the processors 510. Main memory 515 may include, but is not limited to, dynamic random access memory (DRAM). In some embodiments, the RAM or other dynamic storage device or element includes a modified data tracker logic 517 implementing adaptive granularity for reducing cache coherence overhead.

The computing system 500 also may comprise a non-volatile memory 520; a storage device such as a solid-state drive (SSD) 530; and a read only memory (ROM) 535 or other static storage device for storing static information and instructions for the processors 510.

In some embodiments, the computing system 500 includes one or more transmitters or receivers 540 coupled to the bus 505. In some embodiments, the computing system 500 may include one or more antennae 544, such as dipole or monopole antennae, for the transmission and reception of data via wireless communication using a wireless transmitter, receiver, or both, and one or more ports 542 for the transmission and reception of data via wired communications. Wireless communication includes, but is not limited to, Wi-Fi, Bluetooth™, near field communication, and other wireless communication standards.

In some embodiments, computing system 500 includes one or more input devices 550 for the input of data, including hard and soft buttons, a joy stick, a mouse or other pointing device, a keyboard, voice command system, or gesture recognition system.

In some embodiments, computing system 500 includes an output display 555, where the output display 555 may include a liquid crystal display (LCD) or any other display technology, for displaying information or content to a user. In some environments, the output display 555 may include a touch-screen that is also utilized as at least a part of an input device 550. Output display 555 may further include audio output, including one or more speakers, audio output jacks, or other audio, and other output to the user.

The computing system 500 may also comprise a battery or other power source 560, which may include a solar cell, a fuel cell, a charged capacitor, near field inductive coupling, or other system or device for providing or generating power in the computing system 500. The power provided by the power source 560 may be distributed as required to elements of the computing system 500.

It will be apparent from this description that aspects of the described embodiments could be implemented, at least in part, in software. That is, the techniques and methods described herein could be carried out in a data processing system in response to its processor executing a sequence of instructions contained in a tangible, non-transitory memory such as the memory 515 or the non-volatile memory 520 or a combination of such memories, and each of these memories is a form of a machine readable, tangible storage medium.

Hardwired circuitry could be used in combination with software instructions to implement the various embodiments. For example, aspects of the described embodiments can be implemented as software installed and stored in a persistent storage device, which can be loaded and executed in a memory by a processor (not shown) to carry out the processes or operations described throughout this application. Alternatively, the described embodiments can be implemented at least in part as executable code programmed or embedded into dedicated hardware such as an integrated circuit (e.g., an application specific IC or ASIC), a digital signal processor (DSP), a field programmable gate array (FPGA), or controller which can be accessed via a corresponding driver and/or operating system from an application. Furthermore, the described embodiments can be implemented at least in part as specific hardware logic in a processor or processor core as part of an instruction set accessible by a software component via one or more specific instructions.

Thus the techniques are not limited to any specific combination of hardware circuitry and software or to any particular source for the instructions executed by the data processing system.

All or a portion of the described embodiments can be implemented with logic circuitry, such as the above-described ASIC, DSP or FPGA circuitry, including a dedicated logic circuit, controller or microcontroller, or other form of processing core that executes program code instructions. Thus processes taught by the discussion above could be performed with program code such as machine-executable instructions that cause a machine that executes these instructions to perform certain functions. In this context, a "machine" is typically a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture can be used to store program code. An article of manufacture that stores program code can be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM) or other types of memory described elsewhere in this application. Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The described embodiments also relate to an apparatus for performing the operations described herein. This apparatus can be specially constructed for the required purpose, or it may comprise a general-purpose computer selectively activated or reconfigured by a computer program stored in the computer. Either way, the apparatus provides the means for carrying out the operations described herein. The computer program can be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems can be used with programs in accordance with the teachings herein, or it may prove convenient to construct a more specialized apparatus to perform the operations described. The required structure for a variety of these systems will be evident from the description provided in this application. In addition, the embodiments are not described with reference to any particular programming language. It will be appreciated that a variety of programming languages could be used to implement the teachings of the embodiments as described herein.

Additional example implementations are as follows:

An example method, system, apparatus or computer-readable medium for tracking, in a global cache directory of entries, a coherence of a block of data in a shared cache of data shared among a plurality of nodes of a multi-processor system, wherein tracking comprises allocating region entries for tracking one or more blocks of shared data without tracking an owner of the block, allocating private entries for tracking a single block of unshared data and the owner of the single block, and controlling how blocks are tracked for coherence in the shared cache of data based on whether a requested block is being tracked in any one of the allocated shared entries and allocated private entries.

In another example implementation, the region entry for tracking the one or more blocks of shared data without tracking an owner of the block includes a share vector for identifying sharers of the block of data, and a blocks present vector for indicating whether or not the one or more blocks of shared data is likely to be present in any one or more local caches associated with the identified sharers of the block of shared data.

In another example implementation, the blocks present vector guarantees that the block of data is present when any one or more of the share vector identifies only a single sharer of the block of data, and the blocks present vector indicates only one block of data is present.

In another example implementation, sharers of the block of data include any of a plurality of sockets containing any one or more owners of blocks of data being tracked, the any one or more owners among the plurality of nodes in the multi-processor system.

In another example implementation, the plurality of nodes in the multi-processor system includes any one or more cores of a multi-core processor.

In another example implementation, the private entry for tracking a single block of unshared data and the owner of the single block includes an owner id for identifying a current owner of the single block of unshared data, and a block present vector that indicates whether the single block of unshared data is guaranteed to be present in any one or more local caches associated with the identified current owner of the single block of unshared data.

In another example implementation, controlling how blocks are tracked for coherence in the shared cache of data is based on any one or more of whether the requested block is currently being tracked in any one of the region entry and the private entry, and whether the request for the block of data is to share or not share access to the block.

In another example implementation, whether the requested block is currently being tracked in any one of the region entry and the private entry is based on an entry status indicator that is set for the private entry and not set for the region entry.

In another example implementation, the request for the block of data is to not share access when the data in the requested block has been modified.

In the foregoing specification, embodiments have been described with reference to specific exemplary embodiments. It will be evident that various modifications could be made to the described embodiments without departing from the broader spirit and scope of the embodiments as set forth in the following claims. The specification and drawings are, accordingly, to be regarded in an illustrative sense rather than a restrictive sense.

What is claimed is:

1. An apparatus comprising:
 a shared cache of data shared among a plurality of nodes of a multi-processor system;
 a global cache directory of entries for tracking coherence of a block of data in the shared cache of data, the entries including one or more of:
  a region entry for tracking one or more blocks of shared data without tracking an owner of the block, and
  a private entry for tracking a single block of unshared data and the owner of the single block;
 a shared memory controller to control how blocks are tracked for coherence in the shared cache of data based on whether a requested block is being tracked in any one of the region entry and the private entry, including to track the one or more blocks of shared data at a coarse granularity to identify a possible sharer and which of the one or more blocks of shared data are likely to be present in local caches associated with one or more identified sharers.

2. The apparatus of claim 1, wherein the region entry for tracking the one or more blocks of shared data without tracking an owner of the block includes:
 a share vector for identifying sharers of the block of data; and
 a blocks present vector for indicating whether or not the one or more blocks of shared data is likely to be present in any one or more local caches associated with the one or more identified sharers of the block of shared data.

3. The apparatus of claim 2, wherein the blocks present vector guarantees that the block of data is present when any one or more of:
 the share vector identifies only a single sharer of the block of data, and
 the blocks present vector indicates only one block of data is present.

4. The apparatus of claim 2, wherein sharers of the block of data include any of a plurality of sockets containing any one or more owners of blocks of data being tracked, the any one or more owners among the plurality of nodes in the multi-processor system.

5. The apparatus of claim 4, wherein the plurality of nodes in the multi-processor system includes any one or more cores of a multi-core processor.

6. The apparatus of claim 1, wherein the private entry for tracking a single block of unshared data and the owner of the single block includes:
 an owner id for identifying a current owner of the single block of unshared data; and
 a block present vector that indicates whether the single block of unshared data is guaranteed to be present in any one or more local caches associated with the identified current owner of the single block of unshared data.

7. The apparatus of claim 1 wherein the memory controller is to further control how blocks are tracked for coherence in the shared cache of data based on any one or more of:
whether the requested block is currently being tracked in any one of the region entry and the private entry; and
whether the request for the block of data is to share or not share access to the block.

8. The apparatus of claim 7, wherein whether the requested block is currently being tracked in any one of the region entry and the private entry is based on an entry status indicator that is set for the private entry and not set for the region entry.

9. The apparatus of claim 7, wherein the request for the block of data is to not share access when the data in the requested block has been modified.

10. A computer-implemented method comprising:
tracking, in a global cache directory of entries, a coherence of a block of data in a shared cache of data shared among a plurality of nodes of a multi-processor system, wherein tracking comprises:
allocating region entries for tracking one or more blocks of shared data without tracking an owner of the block;
allocating private entries for tracking a single block of unshared data and the owner of the single block; and
controlling how blocks are tracked for coherence in the shared cache of data based on whether a requested block is being tracked in any one of the allocated shared entries and allocated private entries, including tracking the one or more blocks of shared data at a coarse granularity for identifying a possible sharer and which of the one or more blocks of shared data are likely to be present in local caches associated with one or more identified sharers.

11. The computer-implemented method of claim 10, wherein the region entry for tracking the one or more blocks of shared data without tracking an owner of the block includes:
a share vector for identifying sharers of the block of data; and
a blocks present vector for indicating whether or not the one or more blocks of shared data is likely to be present in any one or more local caches associated with the one or more identified sharers of the block of shared data.

12. The computer-implemented method of claim 11, wherein the blocks present vector guarantees that the block of data is present when any one or more of:
the share vector identifies only a single sharer of the block of data, and
the blocks present vector indicates only one block of data is present.

13. The computer-implemented method of claim 11, wherein sharers of the block of data include any of a plurality of sockets containing any one or more owners of blocks of data being tracked, the any one or more owners among the plurality of nodes in the multi-processor system.

14. The computer-implemented method of claim 13, wherein the plurality of nodes in the multi-processor system includes any one or more cores of a multi-core processor.

15. The computer-implemented method of claim 10, wherein the private entry for tracking a single block of unshared data and the owner of the single block includes:
an owner id for identifying a current owner of the single block of unshared data; and a block present vector that indicates whether the single block of unshared data is guaranteed to be present in any one or more local caches associated with the identified current owner of the single block of unshared data.

16. The computer-implemented method of claim 10, wherein controlling how blocks are tracked for coherence in the shared cache of data is based on any one or more of:
whether the requested block is currently being tracked in any one of the region entry and the private entry; and
whether the request for the block of data is to share or not share access to the block.

17. The computer-implemented method of claim 16, wherein whether the requested block is currently being tracked in any one of the region entry and the private entry is based on an entry status indicator that is set for the private entry and not set for the region entry.

18. The computer-implemented method of claim 16, wherein the request for the block of data is to not share access when the data in the requested block has been modified.

19. At least one non-transitory machine readable medium comprising a plurality of instructions executable by a system to cause the system to:
tracking, in a global cache directory of entries, a coherence of a block of data in a shared cache of data shared among a plurality of nodes of a multi-processor system, wherein tracking comprises:
allocating region entries for tracking one or more blocks of shared data without tracking an owner of the block;
allocating private entries for tracking a single block of unshared data and the owner of the single block; and
controlling how blocks are tracked for coherence in the shared cache of data based on whether a requested block is being tracked in any one of the allocated shared entries and allocated private entries and whether the request for the block of data is to share or not share access to the block, including tracking the one or more blocks of shared data at a coarse granularity for identifying a possible sharer and which of the one or more blocks of shared data are likely to be present in local caches associated with one or more identified sharers.

20. At least one non-transitory machine readable medium of claim 19, wherein:
the region entry for tracking the one or more blocks of shared data without tracking an owner of the block includes:
a share vector for identifying sharers of the block of data, wherein sharers of the block of data include any of a plurality of sockets containing any one or more owners of blocks of data being tracked, the any one or more owners among the plurality of nodes in the multi-processor system, and
a blocks present vector for indicating whether or not the one or more blocks of shared data is likely to be present in any one or more local caches associated with the one or more identified sharers of the block of shared data, wherein the blocks present vector guarantees that the block of data is present when at least one of the share vector identifies only a single sharer of the block of data and the blocks present vector indicates only one block of data is present;
the private entry for tracking a single block of unshared data and the owner of the single block includes:
an owner id for identifying a current owner of the single block of unshared data, and a block present vector that indicates whether the single block of unshared data is guaranteed to be present in any one or more local caches associated with the identified current owner of the single block of unshared data.

\* \* \* \* \*